Nov. 13, 1962  E. G. SUNDBERG  3,064,066
STORAGE BATTERY ELECTRODE
Filed Sept. 17, 1959
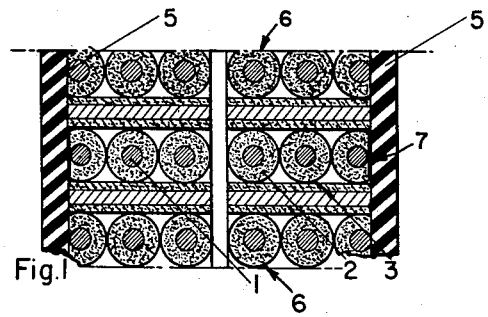
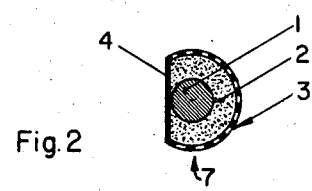
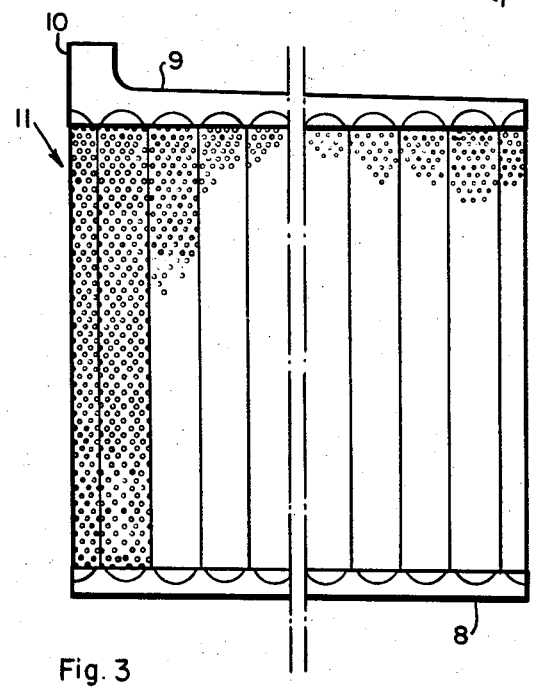
INVENTOR.
Erik Gustav Sundberg
BY
ATTORNEYS

United States Patent Office 3,064,066
Patented Nov. 13, 1962

3,064,066
STORAGE BATTERY ELECTRODE
Erik Gustav Sundberg, Nol, Sweden, assignor to Aktiebolaget Tudor, Stockholm, Sweden, a corporation of Sweden
Filed Sept. 17, 1959, Ser. No. 840,733
Claims priority, application Sweden, Sept. 30, 1958
1 Claim. (Cl. 136—43)

The present invention relates to improvements in storage battery plates of tubular type consisting of pencils of active material or material to become active, in each of which is imbedded a spine or rod and the spines or rods are connected at their ends with top and bottom bars, and the pencils are surrounded by tubular retainers. To prevent short-circuiting between electrodes specially between the outer pencils, the tubular retainers are impermeable in these parts. I.e. the sides of the outer pencils which are directed towards the walls of the container in which the electrodes are mounted, are tight and the material in these parts of the outer pencils never becomes inactive. In addition, in a storage battery with the conventional electrode construction, the electrolyte tends to stagnate between the outer pencils and the battery casing, further preventing the material in these pencils from becoming active. The described embodiment of the outer pencils prevents of course treeing of the material enclosed in their covers. The said unactive material occupies space in the storage battery cell. This means that in an electrode consisting of 15–20 electrode pencils 5–7% of the material to become active remains passive. The present invention eliminates the aforementioned drawbacks and is aimed to raise the capacity of the storage battery by reducing or eliminating the amount of material not being active. According to the invention this goal is achieved by replacing the outer pencils which are commonly of circular cross section like the other pencils by such of semicircular cross section. The outer pencils are in mounted position with their planar surface directed towards the cell walls. In consequence of such a construction it is possible to increase the number of pencils in an electrode to $n+1$ pencils $+2$ semicircular outer pencils, if $n$ is the number of pencils in the original electrode, the outer pencils not counted. To elaborate, it will be borne in mind that in the conventional tubular type positive electrodes such as shown in United States Patent 2,305,121 to Wheat, for example, the two end or outer pencils of active material never become—to any appreciable extent—activated. Therefore, in the conventional electrode having $n+2$ pencils, only $n$ electrodes contribute significantly to the battery output.

In the present invention, an electrode having the same over-all size as an electrode of conventional construction and having pencils of equal diameter, will have one cylindrical pencil less than the conventional electrode; i.e., $n+1$. However, it will also have two semi-circular pencils. And, in contrast to the conventional electrode having only $n$ completely cylindrical pencils which are susceptible of complete activation, it will have $n+1$ cylindrical pencils plus 2 semi-circular pencils all of which may be fully activated, thus giving it an output which could be matched in the conventional electrode only by adding to it at least one more cylindrical pencil, and thereby increasing its size. It is easily perceived that a considerable increase in battery capacity is possible with respect to battery cell volume with electrodes according to the invention compared with hitherto known electrodes. As storage batteries of the relevant type usually are employed in tractionary service it is of importance that the time between necessary chargings is as long as possible.

The accompanying drawing shows an embodiment of the invention which is illustrated by way of example.

Referring to the drawing: FIG. 1 is a fragmentary sectional view of a storage battery incorporating an electrode constructed in accordance with the principles of the present invention showing the circular pencils and the semicircular outer pencils. FIG. 2 is a plan view in transverse section taken through one outer pencil, showing the impermeable planar side. FIG. 3 is a fragmentary view in elevation showing the complete electrode.

The spines 1 are surrounded by active material or material to become active 2 which in its turn is surrounded by the outer cover 3 resistant to the electrolyte. 4 is the planar outer side of the semicircular cover which is impermeable to electrolyte or the active material. The cylindrical pencils 6 and the semicircular pencils 7 thus provided are assembled to a bottom bus bar 8 and to a top bus bar 9 provided with a lug 10 for connecting the electrode 11 thus constructed into the battery circuit. This is a conventional construction, illustrated in the patent to Wheat, referred to above. Side walls in a battery cell are indicated at 5.

Electrodes 11 may be assembled into the battery case defined by walls 5 in the conventional manner illustrated in United States Patent No. 2,318,809 to Snyder. With reference to FIGURE 1 then, a plurality of electrodes 11 are disposed at laterally spaced intervals in the battery with the planar walls 4 of the semi-circular end pencils 7 immediately adjacent the walls 5 of the battery casing. The electrodes 11 are separated by conventional flat plate-like negative electrodes 12 and spacers 13 which are interposed between the positive and negative electrodes. It will be understood, however, that the novel positive electrode provided by the present invention is not limited to use with the particular negative electrode illustrated in FIGURE 1, but that it may alternatively be used with other suitable plate-type electrodes.

The invention may be performed in different ways and the shape of the electrodes may vary without departing from the spirit of the invention. The central spine in the outer pencils may be arranged in a different manner so that said spines may be surrounded by active material on all sides.

I claim:

A rechargeable storage battery comprising, in combination:
(a) a casing having a pair of oppositely disposed vertical walls;
(b) a plurality of spaced apart, plate-like negative electrodes in said casing with their opposite ends abutting said oppositely disposed vertical walls;
(c) a plurality of positive electrodes disposed within said casing in the spaces between the negative electrodes; each of said positive electrodes including:
   (I) a row of vertically arranged cylindrical pencils of active material aligned in side by side relationship and mounted on spines;
   (II) cover means surrounding the active material to hold it in place on each of said pencils; said cover means being permeable to the electrolyte and impermeable to the active material and having a cylindrical cross section; and
   (III) a substantially semi-cylindrical end pencil disposed on each end of the row of cylindrical pencils and aligned therewith, each of said end pencils comprising a spine having the same cross sectional configuration as the spines in said cylindrical pencils; active material surrounding said spine, and a cover surrounding said active material, said cover having a planar outer wall portion immediately adjacent said spine and disposed in surface to surface contact with one of the oppositely disposed vertical walls of said casing, said planar outer wall portion of said cover being impermeable to said active material and said electrolyte and the remainder of said cover being impermeable to said active material but permeable to said electrolyte.

References Cited in the file of this patent

UNITED STATES PATENTS

| | | |
|---|---|---|
| 1,409,895 | Knoblock | Mar. 14, 1922 |
| 2,195,212 | Hall | Mar. 26, 1940 |
| 2,305,121 | Wheat | Dec. 15, 1942 |
| 2,318,809 | Snyder | May 11, 1943 |
| 2,350,752 | Graf | June 6, 1944 |

FOREIGN PATENTS

| | | |
|---|---|---|
| 1,114,429 | France | Dec. 19, 1955 |
| 803,400 | Great Britain | Oct. 22, 1958 |